May 27, 1924.
A. H. LICHTER
1,495,335
SEAT PANEL SECURING MEANS
Filed Oct. 28, 1920
2 Sheets-Sheet 1
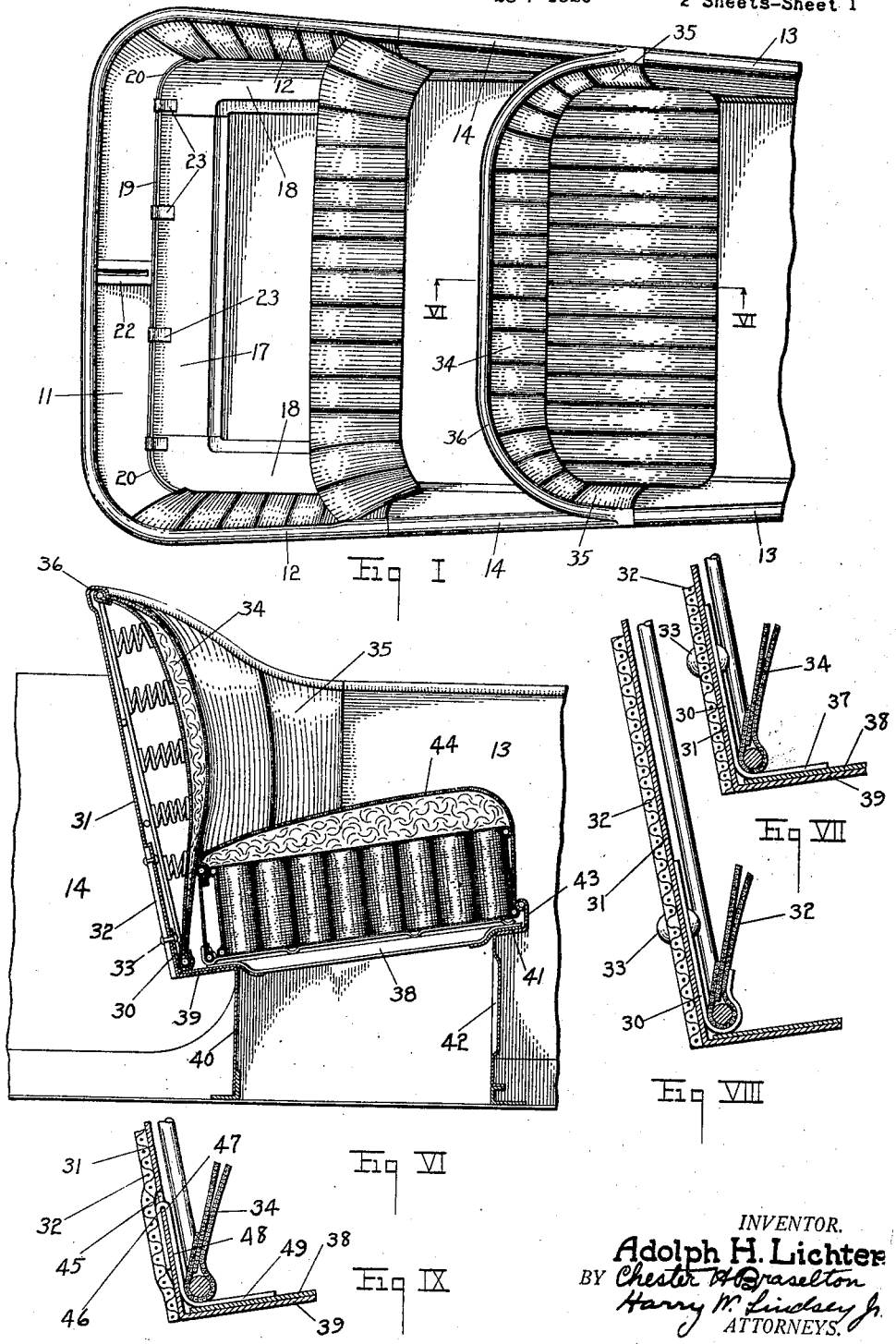
INVENTOR.
Adolph H. Lichter
BY Chester H Braselton
Harry W. Lindsey Jr.
ATTORNEYS.

May 27, 1924.
A. H. LICHTER
1,495,335
SEAT PANEL SECURING MEANS
Filed Oct. 28, 1920
2 Sheets-Sheet 2
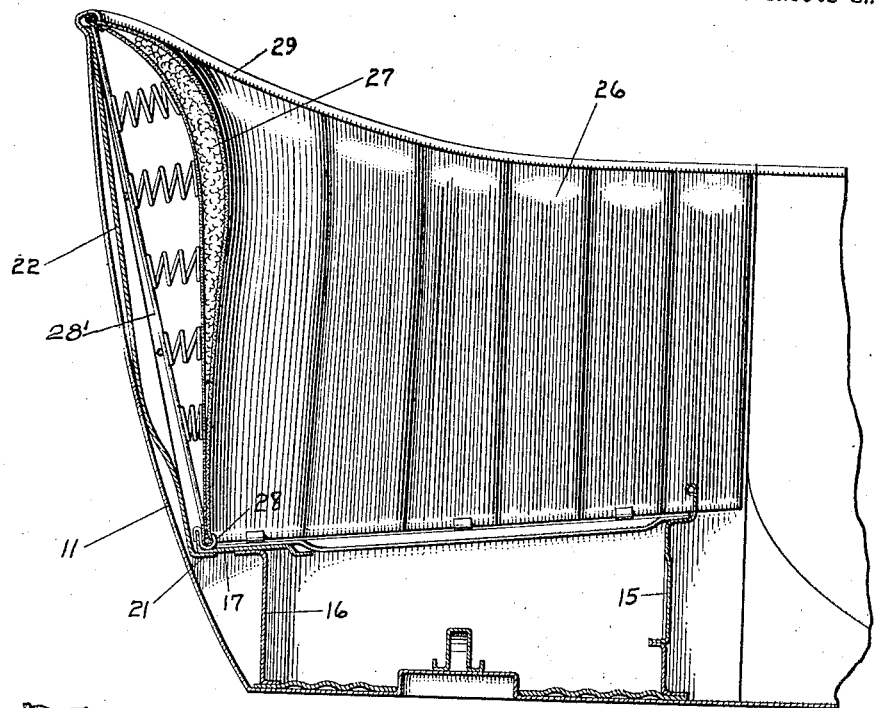
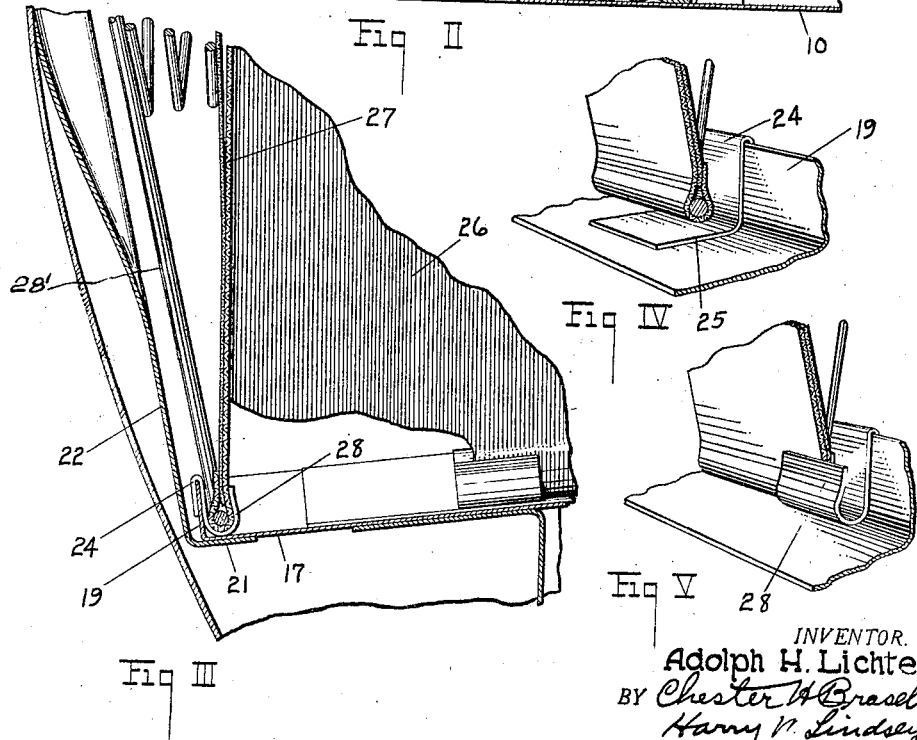
INVENTOR.
Adolph H. Lichter
BY Chester H Braselton
Harry P Lindsey
ATTORNEYS.

Patented May 27, 1924.

1,495,335

UNITED STATES PATENT OFFICE.

ADOLPH H. LICHTER, OF TOLEDO, OHIO, ASSIGNOR TO THE WILLYS-OVERLAND COMPANY, OF TOLEDO, OHIO, A CORPORATION OF OHIO.

SEAT-PANEL-SECURING MEANS.

Application filed October 28, 1920. Serial No. 420,194.

*To all whom it may concern:*

Be it known that I, ADOLPH H. LICHTER, residing at Toledo, in the county of Lucas, State of Ohio, have invented certain new and useful Improvements in Seat-Panel-Securing Means, of which I declare the following to be a full, clear, and exact description.

My invention relates to seat panel securing means and has for its object to provide improved means of this character, which will permit the side and back upholstered seat units of an automobile body to be readily and quickly assembled and secured upon the body.

A further object of the invention is to provide an improved form of clip for retaining upholstery upon the body of a vehicle.

Another object of the invention is to provide an improved method of assembling and securing upholstered seat panels upon the body structure of an automobile.

With these and other objects in view the invention comprises certain novel forms of construction and arrangement of parts which will be hereinafter more fully pointed out and claimed, it being understood that the invention is susceptible to various modifications and changes in the detailed forms of construction and I therefore do not wish to be limited to the specific embodiment shown, except in so far as the same is limited by the appended claims.

A structure constituting one embodiment of the invention is illustrated in the accompanying drawings, in which:

Figure I is a plan of the seating arrangement of an automobile showing the retaining clips in position upon the rear seat structure to receive the upholstered panel forming the back of the seat.

Figure II is a longitudinal section taken through the rear portion of the body of the vehicle.

Figure III is an enlarged fragmentary section illustrating the manner in which the clips are applied to secure the lower edge of the upholstered unit upon the rear seat structure.

Figure IV is an enlarged detail perspective illustrating the position of the clip before being bent to clamp the lower edge of the upholstery upon the frame structure.

Figure V is a similar view showing the clip bent into clamping position upon the upholstery.

Figure VI is a sectional elevation through the front seat taken on line VI—VI of Figure I.

Figures VII and VIII are enlarged sectional views through the lower back portion of the front seat showing a slightly modified form of clip before and after the same is bent into clamping engagement with the upholstery units and Figure IX is a detail section of a clip similar to that shown in Figure IV, the same being used in connection with a slightly different form of seat structure.

Like reference characters refer to similar parts throughout the several views of the drawings.

Considering the present embodiment of the invention, 10 represents the floor of an automobile body from which extends upwardly the back portion 11 of the body having the forwardly extending side portions 12 with which are aligned the usual front and rear side doors 13 and 14 respectively.

Extending upwardly from the floor 10 are the front and rear seat supporting plate members 15 and 16 respectively adapted to carry a suitably constructed seat frame, which may be composed of the transverse plate member 17 and end member 18 suitably connected therewith, said frame 17 having an upstanding flange or edge portion 19 aligned with similar upstanding flanges 20 on the end members 18, the back portion of the frame member 17 being preferably carried by the flange 21 of the inwardly disposed brace or frame member 22 positioned upon the inner wall of the back portion 11 of the vehicle body as shown in Figures I and II. As seen from Figure I the upstanding plate portions 19 and 20 of the frame members 17 and 18 respectively extend around the back and sides of the body adjacent the inner wall thereof and form supporting means for the retaining clips 23, which comprise the hook portions 24 adapted to be hooked over the upstanding flanges 19 and 20 in the manner shown in Figures III and IV. The clips further comprise the forwardly or inwardly extending angular portions 25 which normally lie upon the horizontal portions of the frame members 17 and 18 previous to being bent into clamping engagement with the lower edges of the end and back upholstered units 26 and 27 respectively, as indicated at 28 in Figures II, III and V. The upholstered units 26 and 27 may be of any desired construction, but are preferably made as shown in Figure II with a back frame 28' the upper portion of which engages beneath the flange 29 while the lower portion is engaged by the clips 28. In assembling these units upon the seat structure, their upper edges are first inserted under the inturned flange or plate portion 29 of the body portions 11 and 12 and their lower edges are then forced inwardly over the unbent portions 25 of the clips 23, it being understood of course that the clips will have been previously applied to the frame members 17 and 18 as shown in Figure IV. After forcing the lower edges of the upholstered units inwardly over the flat portions 25 of the clips the latter are bent upwardly by forcing a suitable tool, such as a cold chisel beneath the same, after which they may be driven into clamping engagement with the upholstery as shown in Figure III. When this has been done the clips are composed of oppositely extending hook portions, one of which is hooked over the upstanding plate member and the other around the lower edge of the upholstery to engage the same on opposite sides thereof. The seat cushion may then be inserted upon the frame structure in the usual manner.

In the construction shown in Figures VI to VIII inclusive the method of application is the same as described above, except that the clips 30 are secured to the back 31 of the seat and also to the foot pad 32 thereon by means of the rivets 33, the clips in this case being constructed as shown in Figure VII and riveted in position previous to the assembly of the upholstered units, which in this instance comprise the back and end units 34 and 35 respectively, the upper edges of which are disposed under the inturned flange portion 36 of the seat back 31. The inwardly extending portions 37 of the clips 30 are adapted to rest upon the frame plates 38 supported by the horizontally disposed portion 39 of the upstanding plate member 40, as shown in Figure VI. The front ends of the frame plates 38 are carried by the horizontally disposed portion 41 of the upstanding plate member 42, said horizontal portion being turned up as indicated at 43 to serve as a stop for the seat cushion 44, which is removably mounted upon the frame members 38.

In the embodiment shown in Figure IX the seat construction is the same as that shown in Figure VII except that the plate 31 is slotted at 45 to afford an edge portion 46 adapted to receive the hook portion 47 of the clip 48 having the inwardly extending angular portion 49 adapted to be bent into engagement with the bottom edge of the upholstered unit 34 in a manner similar to that described in connection with the clips 23, the clips 48 being substantially the same as the clips 23 and being also applied in a similar manner.

It will be apparent to those skilled in the art that the invention shown and described herein is susceptible of various modifications, embodiments and arrangements to suit special or varying conditions, and I wish it to be understood that the terms which I have used are merely descriptive and not limiting and that it is my intention to include any and all modifications which come within the scope of the invention as defined in the appended claims.

What I claim as new and desire to secure by Letters Patent is:

1. In a device of the class described, a seat frame having an upstanding edge, a seat cushion disposed upon the frame and a clip having a portion hooked over said upstanding edge and a retaining portion for the cushion bent into engagement therewith.

2. In a device of the class described, a seat frame having an upstanding edge, a seat cushion disposed upon the frame and a clip having a portion hooked over said upstanding edge and a bent portion adapted to engage the edge of the cushion on opposite sides thereof.

3. In a device of the class described, a seat supporting structure including a plate member, a cushion disposed upon said structure and a clip having a bent portion engaging said plate on opposite sides thereof and another bent portion adapted to engage the edge of the cushion on opposite sides thereof.

4. In a device of the class described, a seat supporting structure including an upstanding plate member, a cushion disposed upon said structure and a clip having a bent portion engaging the upper edge of said plate and another bent portion engaging an edge portion of said cushion to retain the same.

5. In a device of the class described, a seat supporting structure including angularly disposed upstanding plate portions, a plurality of upholstered units forming the sides and back of a seat disposed upon said structure and clips for each of said units having bent portions clamped upon the lower edges of the units and oppositely bent portions hooked over the edges of said angularly disposed upstanding plate portions.

6. In a device of the class described, a seat supporting structure including angularly disposed upstanding plate portions, a plurality of upholstered units forming the sides and back of a seat disposed upon said structure, means upon the structure adapted to engage and retain the upper edges of said upholstered units, and clips for each of said units having bent portions clamped upon the lower edge of the units and oppositely bent portions hooked over the edges of said angularly disposed upstanding plate portions.

7. In a device of the class described, a seat supporting structure including an upstanding plate portion, an upholstered unit disposed upon said structure, inwardly extending retaining means carried by said structure and overlying the upper edges of said upholstered unit and a plurality of clips secured at one end to said upstanding plate portions, and having bent portions extending from said plate portions down and around the lower edge of said upholstered unit to hold said unit compressed against said retaining means.

8. A cushion retaining member comprising a clip having oppositely extending bent portions one of which is adapted to engage the edge of the cushion on opposite sides thereof and the other to be hooked over an edge portion of a plate member.

9. A cushion retaining member comprising a clip having a hook portion having parallel sides adapted to be hooked over and to be compressed to firmly clamp an edge portion of a plate member and an angular portion extending from the hook portion and adapted to be bent around the edge portion of a cushion to retain the same.

In testimony whereof I affix my signature.

ADOLPH H. LICHTER.